Nov. 21, 1944. W. A. REICHEL 2,363,143
AIRSPEED INDICATOR
Filed June 13, 1942 2 Sheets-Sheet 1
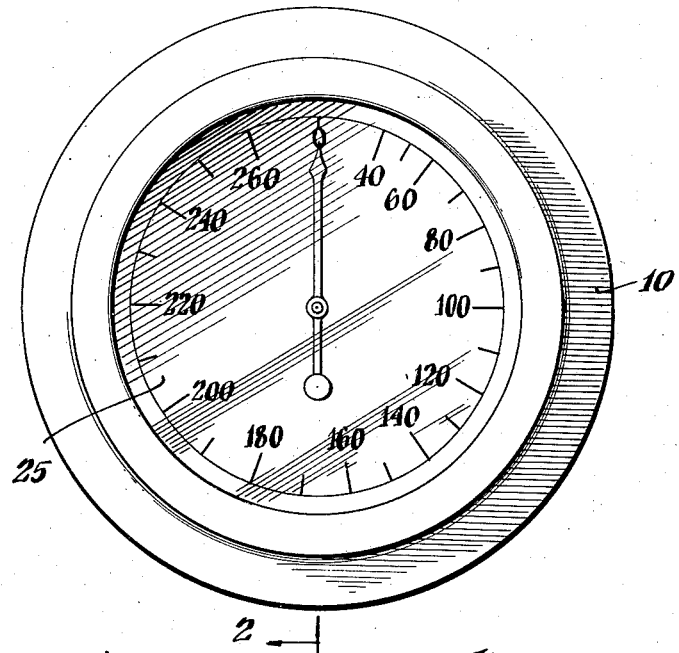
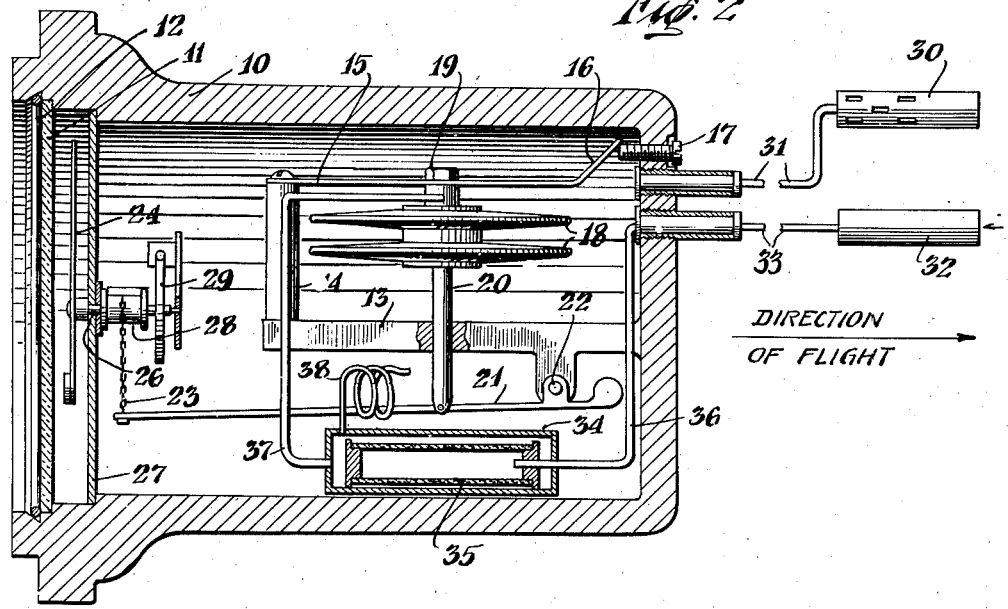
INVENTOR.
W. A. REICHEL
BY
ATTORNEY

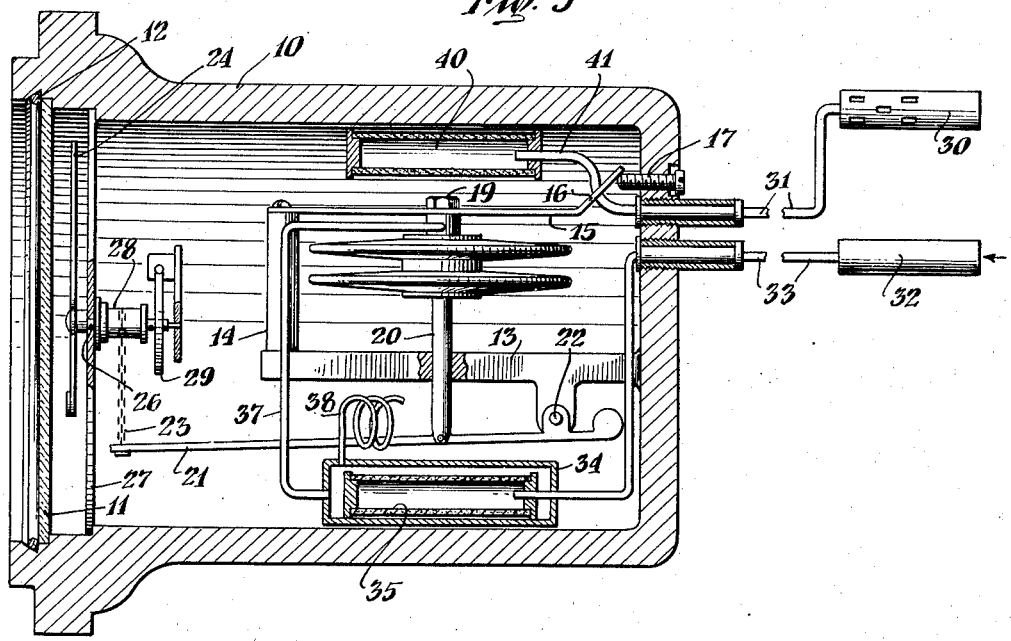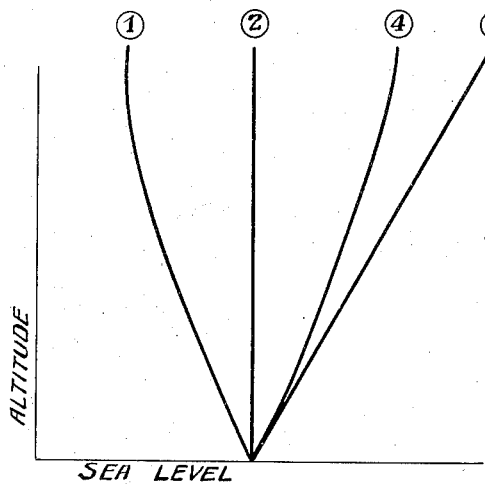

Patented Nov. 21, 1944

2,363,143

UNITED STATES PATENT OFFICE 2,363,143

AIR-SPEED INDICATOR

Wladimir A. Reichel, Hackensack, N. J., assignor to Bendix Aviation Corporation, Bendix, N. J., a corporation of Delaware Application June 13, 1942, Serial No. 446,961

17 Claims. (Cl. 73—182)

This invention relates to pressure responsive instruments and more particularly to airspeed indicators adapted for use on aircraft.

Known types of airspeed indicators are designed to measure the dynamic pressure, $\frac{1}{2}pv^2$, where $p$ is the density of the air and $v$ is the craft velocity relative to the air. Since air density is not constant at all altitudes, the calibration of a standard airspeed indicator cannot be made true for all altitudes and, therefore, in flight, the pilot must correct the indicated airspeed reading in accordance with the flight altitude.

An object of the present invention, therefore, is to overcome the foregoing disadvantages and to provide a novel airspeed indicator with automatic altitude correction.

Another object of the invention is to provide a novel airspeed indicator which may be calibrated to give true airspeed readings for any flight altitude.

A further object of the invention is to provide a novel airspeed indicator having novel altitude correcting means which operate to compensate for the pressure drop due to decreased air density encountered at increased flight altitude.

Another object of the present invention is to provide novel compensating means between the dynamic and static pressure sides of an airspeed indicator whereby automatic error correction is obtained.

Other and further objects and advantages of the invention will appear more fully hereinafter from a consideration of the detailed description which follows, taken together with the accompanying drawings. It is to be expressly understood, however, that the drawings are for the purposes of illustration only and are not designed as a definition of the limits of the invention.

In the drawings wherein like reference characters refer to like parts throughout the several views Figure 1 is a front elevation view of one form of an airspeed indicator embodying the subject matter of the present invention;

Figure 2 is a view in section taken substantially along line 2—2 of Figure 1;

Figure 3 is a view similar to Figure 2 illustrating a modified form of the present invention; and Figure 4 is a set of curves illustrating the characteristics at varying altitudes of the novel compensating means of the present invention.

The differential pressure responsive element of known airspeed indicators is exposed at one of its sides to the static pressure and at its opposite side to the dynamic pressure. For a given craft velocity at a given altitude the differential pressure actuating the pressure responsive element will remain constant, however, this relationship cannot exist at all altitudes for the same craft velocity because the air density decreases with increased altitude. With an increasing flight altitude, therefore, the air density decreases, as does the pressure differential across the pressure responsive element, and gradually the underreading error of the indicator is increased. Curve 1, of Figure 4, clearly illustrates how, with an increase in flight altitude, the surrounding air density gradually drops below its value at sea level.

To overcome the increased reading error, and also, the necessity on the part of the pilot continuously to apply a correction to the readings, a novel altitude correction is provided by the present invention whereby a greater volume of air is passed to the pressure responsive element at higher altitudes. In this manner, notwithstanding the flight altitude, the proper relationship in differential pressure across the pressure responsive element is maintained for the same given craft velocity.

The altitude correction consists in the provision of a novel restricted leak or communication between the dynamic and static pressure sides of a Pitot tube associated with the airspeed indicator. Such leak comprises a porous unglazed diffuser element whose inherent characteristic is to pass a greater volume of air through its walls by diffusion as the density of the surrounding air is decreased. Stated in another manner, the resistance of a porous element of this nature to the diffusion of air through its walls is decreased as the surrounding pressures drop. This characteristic of the diffuser element is illustrated by curve 3 of Figure 4. For a more detailed description and a better understanding of the construction and operation of the porous diffuser element alone, reference is made to U. S. Patent No. 2,147,108, issued February 14, 1939, to G. V. Rylsky and assigned to the assignee of the present invention.

To prevent a building up of too great a pressure differential across the pressure responsive element, which would otherwise result and produce an over-reading, the diffuser element is placed in series with the static side of a Pitot tube by means of a capillary tube defining a restricted leak. A capillary tube or gap of this nature is known in the art and possesses the characteristic of passing a substantially constant volume of air therethrough at a constant differential pressure. Curve 2, of Figure 4, illustrates the volume of air passed by a capillary tube at sea level and at altitude at a constant differential pressure. With gradually decreasing pressures, the volume of air flowing through a capillary tube is decreased and the output flow will be of the nature of curve 1 of Figure 4. For a more detailed description of the nature and operation of capillary leaks, reference is made to U. S. Patent No. 2,142,338, issued January 3, 1939, to A. E. Sidwell, and U. S. Patent No. 2,275,719, issued March 10, 1942, to J. E. Bevins, both of which have been assigned to the assignee of the present invention.

Referring now to the drawings and more particularly to Figure 2 thereof, for a more detailed description of one embodiment of the present invention, the novel airspeed indicating instrument is shown as comprising a housing 10 having its open end provided with a suitable cover glass 11 held in place by means of a split ring 12. Secured to or formed integrally with the rear of the housing is a standard 13 having at its free end a post 14 to which is secured a resilient supporting arm 15 having a bent portion 16 with which engages an adjusting screw 17, accessible from the rear of the instrument for initially adjusting the position of arm 15.

The pressure responsive element, which in the form shown comprises two inter-communicating expansible and contractible diaphragms 18, is carried by resilient arm 15 and rigidly secured thereto by way of a nut 19. An actuating post 20, carried by one of the diaphragms 18, is pivotally connected to a link 21, pivoted at 22 on standard 13. Link 21 is adapted through a suitable connection, such as a chain element 23, to operate a pointer 24.

Pointer 24 is superimposed for rotation over a dial 25 (Figure 1) by means of a shaft 26 journalled in a sealing plate 27 carrying the dial thereon. Pointer shaft 26 has a pulley 28 secured thereto which is actuated by link 21 through chain element 23 against the action of a coiled spring 29 anchored at one end to the interior of housing 10 and at its other end to pointer shaft 26. With contraction or expansion of diaphragms 18, link 21 is swung upwardly or downwardly through the agency of post 20 and transmits its motion to pulley 28 through element 23 to rotate pointer 24 in either direction over dial 25.

The interior of housing 10 and, therefore, the outside of diaphragms 18, is exposed to static pressure which is communicated to the housing from a static pressure source 30 by way of a suitable conduit 31, while dynamic pressure is communicated to the interior of diaphragms 18 from a dynamic or impact pressure source 32 by way of a conduit 33 in a manner to presently appear. In actual installation pressure sources 30 and 32 correspond to the static side and the dynamic or impact side of a conventional Pitot tube.

As pointed out above, if the interior of diaphragms 18 were connected directly to conduit 33 of the dynamic pressure source, errors in airspeed reading would result at increased altitude for the reason that air density is decreased. Coming now to the novel altitude error compensating means of the present invention, a hollow cylindrical member 34 is arranged in the dynamic pressure line and encloses therein a hollow porous plug or diffuser element 35.

The porous plug or diffuser element may be constructed from carbon, porcelain, compressed powder or metal wool, paper, or very thin metal such as gold. The final product should have many small compressed sharp grains defining many small, short passages in the manner shown and described in the above referred to G. V. Rylsky patent.

The interior of diffuser 35 communicates by way of a conduit 36 with the dynamic pressure conduit 33 while the interior of member 34 connects by way of a conduit 37 with the interior of diaphragms 18. The interior of member 34, furthermore, is provided with a restricted leak to the interior of housing 10 in the form of a capillary tube 38. Diffuser 35 and capillary tube 38 are thus placed in series between the dynamic and static pressure sides of the instrument.

In operation as craft altitude is increased, the pressure acting within diaphragms 18 would normally tend to decrease due to drop in air density, however, the porous element 35 responds to the same pressure drop to pass an increasing volume of air to the interior of member 34 and to the interior of diaphragm 18 by way of conduit 37. The increased volume of air within member 34 cannot immediately pass to the static pressure side, that is, to the interior of the housing, so that pressure builds up at the inlet of capillary tube 38 and the latter begins to deliver a greater volume of air than it would normally under the then existing pressure condition. A greater pressure drop is created across the capillary tube causing diaphragms 18 to expand because the diaphragms respond to and measure such pressure drop. Curve 4, of Figure 4, illustrates the ratio between the volume of air passed through the system and the altitude, at varying altitude, such ratio being maintained by means of the combined diffuser element and the capillary tube. The increased volume of air flow developed by the compensating means in accordance with curve 4 is of such nature as to offset the decreased density effect of curve 1 and thus maintain the pressure differential constant.

The reverse operation takes place during craft descent. Under this condition, altitude is decreased and air density increased, so that the resistance of the porous element is increased to pass a smaller volume of air to member 34 and diaphragms 18 and to, at all times, maintain the pressure differential across the diaphragms substantially constant for a given craft velocity at all altitudes.

In the foregoing manner, the effect of a decrease in dynamic pressure with an increase of altitude, is offset and the instrument is automatically corrected for errors otherwise arising during varying altitude flight.

The automatic altitude correction described above may likewise be obtained in a slightly different form by the use of a second and additional porous plug or diffuser element 40, similar in all respects to diffuser 35. As clearly shown in Figure 3 of the drawings, the second diffuser 40 communicates at its interior with the static pressure source 30 by way of conduits 41 and 31, the remainder of the instrument being the same as that of Figure 1. In this manner an amplifying effect is provided by arranging diffuser 35, capillary tube 38 and diffuser 40 in series between the dynamic and static pressure sides of the system. Since the dynamic pressure is relatively far greater than the static pressure, the pressure drop at the static side, because of decreased air density, will effect an increasingly greater diffusion to the interior of diffuser 40 to thereby increase the pressure drop across the capillary tube 38. Since diaphragms 18 measure the pressure drop across the capillary tube, the relatively greater pressure drop across the capillary due to the second diffuser 40 will manifest itself in a more rapid expansion of the diaphragms, giving a practically instantaneous automatic altitude correction.

It will now be apparent to those skilled in the art that a novel and desirable airspeed indicating instrument has been provided having a simple but effective automatic altitude correction which requires no moving parts and, therefore, once the instrument has been calibrated it is ready for use under any and substantially all altitude conditions.

Although only two embodiments of the invention have been illustrated and described in detail, various changes in the form and relative arrangement of parts which will now appear to those skilled in the art may be made without departing from the scope of the invention. Reference is, therefore, to be had to the appended claims for a definition of the limits of the invention.

I claim:

1. In an airspeed indicator having pressure responsive means, means for establishing a pressure differential on said pressure responsive means comprising a static pressure connection to one side of said pressure responsive means and a dynamic pressure connection to an opposite side of said pressure responsive means, indicating means actuated by said pressure responsive means, and altitude compensating means in one of said pressure connections responsive to a change in absolute pressure for changing the pressure within said one connection and thereby varying the pressure differential developed on said pressure responsive means.

2. In an airspeed indicator having pressure responsive means, means for establishing a pressure differential on said pressure responsive means comprising a static pressure connection to one side of said pressure responsive means and a dynamic pressure connection to an opposite side of said pressure responsive means, indicating means actuated by said pressure responsive means, and altitude error compensating means comprising a capillary connection between said pressure connections for changing the pressure differential on said pressure responsive means in accordance with a change in absolute pressure.

3. In an airspeed indicator having pressure responsive means, means for establishing a pressure differential on said pressure responsive means comprising a static pressure connection to one side of said pressure responsive means and a dynamic pressure connection to an opposite side of said pressure responsive means, indicating means connected for actuation by said pressure responsive means, and altitude compensating means comprising a porous element in said dynamic pressure connection responsive to changes in absolute pressure for changing the pressure within said dynamic connection to thereby vary the pressure differential developed on said pressure responsive means.

4. In a airspeed indicator having pressure responsive means, means for establishing a pressure differential on said pressure responsive means comprising a static pressure connection to one side of said pressure responsive means and a dynamic pressure connection to an opposite side of said pressure responsive means, indicating means connected for actuation by said pressure responsive means, and means including a porous element between said pressure connections, the porosity of said element being predetermined so that said element responds to changes in absolute pressure to vary the pressure within one of said connections to thereby automatically provide altitude compensation.

5. In an airspeed device having pressure responsive means, means for establishing a pressure differential on said pressure responsive means comprising a static pressure connection to one side of said pressure responsive means and a dynamic pressure connection to an opposite side of said pressure responsive means, means connected for actuation by said pressure responsive means, and altitude error compensating means arranged in series with said pressure connections responsive to a change in absolute pressure for changing the pressure within one of said connections to thereby vary the pressure differential developed on said pressure responsive means.

6. In an airspeed indicator having pressure responsive means, means for establishing a pressure differential on said pressure responsive means comprising a static pressure connection to one side of said pressure responsive means and a dynamic pressure connection to an opposite side of said pressure responsive means, means connected for actuation by said pressure responsive means, a porous element in said dynamic connection, and means providing a restricted communication between said porous element and said static connection, said last-named means together with said porous element responding to a drop in absolute pressure to vary the pressure differential on said pressure responsive means.

7. In an airspeed indicator having pressure responsive means, means for establishing a pressure differential on said pressure responsive means comprising a static pressure connection to one side of said pressure responsive means and a dynamic pressure connection to an opposite side of said pressure responsive means, means comprising a porous element in said dynamic pressure connection and in series with said static pressure connection, and a second porous element in said static pressure connection, said elements responding to a change in absolute pressure to vary the pressure within said connections to thereby change the pressure differential on said pressure responsive means.

8. An airspeed indicator comprising a resilient diaphragm, means for establishing a pressure differential on said diaphragm including a static pressure connection to one side of said diaphragm and a dynamic pressure connection to an opposite side of said diaphragm, indicating means connected for actuation by said diaphragm, and means comprising a pair of diffuser elements responsive to a change in absolute pressure for varying the pressure differential on said diaphragm, one of said diffusers being arranged in one of said pressure connections to vary the pressure within said one connection in response to a change in absolute pressure and the other of said diffusers being arranged in the other of said pressure connections to vary the pressure within said other connection in response to a change in absolute pressure.

9. An airspeed indicator comprising a resilient diaphragm, means for establishing a pressure differential on said diaphragm including a static pressure connection to one side of said diaphragm and a dynamic pressure connection to an opposite side of said diaphragm, indicating means connected for actuation by said diaphragm, and altitude error compensating means in said dynamic pressure connection comprising a porous element and a capillary element connecting said dynamic and static pressure connections.

10. An airspeed indicator comprising a resilient diaphragm, means for establishing a pressure differential on said diaphragm including a static pressure connection to one side of said diaphragm and a dynamic pressure connection to an opposite side of said diaphragm, indicating means connected for actuation by said diaphragm, a diffuser element arranged in said dynamic connection, a capillary element providing restricted communication between said diffuser element and said static connection, and a second diffuser element in said static pressure connection, all of said elements acting during a change in absolute pressure to vary the pressure differential on said diaphragm.

11. An airspeed indicator for use on an aircraft comprising a resilient diaphragm, means for establishing a pressure differential on said diaphragm including a static pressure connection to one side of said diaphragm and a dynamic pressure connection to an opposite side of said diaphragm, indicating means connected for actuation by said diaphragm, and altitude error compensating means comprising a diffuser element of predetermined porosity responsive to a change in absolute pressure arranged in communication with said dynamic and static pressure connections for passing an increasingly greater volume of air to said opposite diaphragm side during increasingly greater craft altitude flight.

12. An aircraft airspeed indicator comprising a casing, a differential pressure responsive element mounted within said casing, means for establishing a pressure differential on said pressure element including a static pressure connection to one side of said pressure element and a dynamic pressure connection to an opposite side of said pressure element, indicating means connected for actuation by said pressure element, and means comprising a porous diffuser element responsive to a change in absolute pressure arranged in series with said dynamic pressure connection and said static pressure connection for passing an increasingly greater volume of air to said opposite diaphragm side during increasingly greater craft altitude flight to thereby compensate for decreased air density encountered at increased altitudes.

13. In an instrument of the class described, an indicator, a pressure responsive element subjected to the static and dynamic pressures of a relatively movable air stream, an actuating connection from said element to said indicator, means communicating said static pressure to one side of said pressure element, means communicating said dynamic pressure to an opposite side of said pressure element responsive to a change of absolute pressure, and means comprising a porous element arranged in said dynamic pressure means and restrictedly exposed to said static pressure for passing a greater volume of air to said opposite pressure element side with a drop in the density of said air stream.

14. The combination with an airspeed indicator having an indicating element operated by mechanism including a diaphragm element subject on one of its sides to static pressures and on its opposite side to dynamic pressures, of means including a porous element responsive to a change in absolute pressure interposed between said dynamic pressure and said opposite diaphragm side and in restricted communication with said static pressure side.

15. The combination with an airspeed indicator having an indicating element operated by mechanism including a diaphragm element subject on one of its sides to static pressures and on its opposite side to dynamic pressures, of means including a porous element responsive to a change in absolute pressure interposed between said dynamic pressure and said opposite diaphragm side, and a second porous element responsible to a change in absolute pressure interposed between said static pressure and said one diaphragm side.

16. In an airspeed device having pressure responsive means, means for establishing a pressure differential on said pressure responsive means comprising a static pressure connection to one side of said pressure responsive means and a dynamic pressure connection to an opposite side of said pressure responsive means, means actuated by said pressure responsive means, an altitude compensating means comprising a member interposed in one of said connections, a diffuser element within said member, and a capillary tube communicating said member with the other of said connections.

17. In an airspeed device having pressure responsive means, means for establishing a pressure differential on said pressure responsive means comprising a static pressure connection to one side of said pressure responsive means and a dynamic pressure connection to an opposite side of said pressure responsive means, means connected for actuation by said pressure responsive means, and altitude compensating means in one of said pressure connections responsive to a change in absolute pressure for changing the pressure within said one connection and thereby varying the pressure differential developed on said pressure responsive means.

WLADIMIR A. REICHEL.